US00RE36167E

United States Patent [19]

Barnes

[11] E Patent Number: Re. 36,167

[45] **Reissued Date of Patent: *Mar. 30, 1999**

[54] AIR BAG DEPLOYABLE INSTRUMENT PANEL COVER

[75] Inventor: William J. Barnes, Waterford, Mich.

[73] Assignee: General Motors Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 691,156

[22] Filed: Aug. 1, 1996

Related U.S. Patent Documents

Reissue of:

[64] Patent No.: 5,333,901
Issued: Aug. 2, 1994
Appl. No.: 51,123
Filed: Apr. 26, 1993

[51] Int. Cl.[6] ..... B60R 21/20

[52] U.S. Cl. ..... 280/732; 180/90

[58] Field of Search ..... 280/732, 728.3, 280/728.2, 730.1, 752; 180/90; 296/70, 72, 73

[56] References Cited

U.S. PATENT DOCUMENTS

| | | | |
|---|---|---|---|
| 2,818,933 | 1/1958 | Tell | 180/90 |
| 3,794,349 | 2/1974 | Fuller | 280/732 |
| 3,801,126 | 4/1974 | Knight, IV et al. | 280/732 |
| 3,817,552 | 6/1974 | Knight, IV et al. | 280/732 |
| 5,066,037 | 11/1991 | Castrigno et al. | 280/728.3 |

FOREIGN PATENT DOCUMENTS

| | | | |
|---|---|---|---|
| 41 37 926 | 5/1992 | Germany | 280/728.3 |
| 41 39 010 | 6/1992 | Germany | 280/728.3 |
| 2-158444 | 6/1990 | Japan | 280/728.2 |
| 5-4556 | 1/1993 | Japan | 280/728.2 |

*Primary Examiner*—Peter C. English
*Attorney, Agent, or Firm*—Charles E. Leahy

[57] ABSTRACT

An air bag module is mounted on the instrument panel structure forwardly of the passenger seating position. An instrument panel cover is mounted atop the instrument panel to conceal the air bag from view and extends transversely substantially the entire distance across the instrument panel forwardly of both the driver and passenger sides of the occupant compartment. The instrument panel cover is fastened to the instrument panel structure by fasteners which include detachable fasteners provided at least at the portion of the instrument panel cover generally forward of the passenger to permit the air bag to lift the instrument panel cover upwardly away from the instrument panel structure upon air bag inflation. The forwardmost edge of the instrument panel is fixedly attached to the vehicle body structure.

10 Claims, 6 Drawing Sheets

AIR BAG DEPLOYABLE INSTRUMENT PANEL COVER

Matter enclosed in heavy brackets [ ] appears in the original patent but forms no part of this reissue specification; matter printed in italics indicates the additions made by reissue.

The invention relates to an improvement in an instrument panel mounted air bag system and more particularly provides an instrument panel cover lifted by the deploying air bag to permit bag deployment into the occupant compartment.

BACKGROUND OF THE INVENTION

It is well known in motor vehicles to provide an inflatable air bag which deploys into the occupant compartment to cushion the occupant. Such air bag systems typically include a driver air bag mounted on the steering wheel and a passenger air bag mounted on the instrument panel forwardly of the passenger seating position.

It is known to mount the passenger air bag module beneath the top surface of the instrument panel and to provide an air bag deployment opening within the padded instrument panel cover. The deployment opening in the instrument panel cover is closed by an air bag door which opens in response to air bag deployment to permit the air bag to deploy into the passenger compartment.

The air bag door conceals the air bag module from view and is supported on the instrument panel cover in a manner which will conceal and protect the air bag module and yet open rapidly in the event of air bag deployment. The prior art has provided many air bag door constructions for closing the deployment opening provided in the instrument panel cover.

It would be desirable to provide an instrument panel mounted air bag which could deploy into the passenger compartment without necessity of providing an air bag deployment opening in the instrument panel cover. In particular, the elimination of the air bag opening would eliminate necessity for an air bag door to close the deployment opening. Elimination of the air bag opening and the air bag door for closing the opening would result in economies of manufacture and assembly labor.

In addition, the elimination of the air bag opening would facilitate the design of aesthetically pleasing instrument panel covers.

SUMMARY OF THE INVENTION

According to the invention, an air bag module is mounted on the instrument panel structure forwardly of the passenger seating position and has an air bag normally stored and folded therein and inflatable to project into the occupant compartment to restrain the passenger. An instrument panel cover is mounted atop the instrument panel to conceal the air bag from view and extends transversely substantially the entire distance across the instrument panel forwardly of both the driver and passenger sides of the occupant compartment. The instrument panel cover is fastened to the instrument panel structure by fasteners which include detachable fasteners provided at least at the portion of the instrument panel cover generally forward of the passenger to permit the air bag to lift the instrument panel cover upwardly away from the instrument panel structure upon air bag inflation so that the air bag is projected into the passenger compartment. The forwardmost edge of the instrument panel is fixedly attached to the vehicle body structure. According to the invention, the detachable fasteners may be used only in front of the passengers so that only the corner of the instrument panel cover is lifted by the inflating air bag. Alteratively, the detachable fasteners may be deployed all across the rearwardmost edge of the panel cover so that the entire instrument panel cover can be lifted up. The instrument panel cover is preferably constructed of flexible molded plastic and overlaid by foam which adheres to the plastic to retain the molded plastic in the event that the lifting and flexing of the instrument panel cover fractures the molded plastic. The molded plastic cover preferably includes longitudinally extending ribs which reinforce at least the portion of the instrument panel cover overlying the air bag module so that the ribs will channel the inflating air bag into the passenger compartment. The instrument panel cover may also include a lip depending from the rearwardmost edge of the instrument panel cover to provide stiffening and reinforcement, and have angularly ramped stiffening flanges which support the lip and are engaged by the inflating air bag to channel the inflated air bag into the occupant compartment without being retarded by engagement with the depending lip.

Accordingly, the object, feature and advantage of the invention resides in the provision of a motor vehicle instrument panel including an air bag concealed beneath an instrument panel cover without necessity for an air bag opening in the cover.

A further object, feature and advantage of the invention resides in the provision of an instrument panel cover extending transversely across the instrument panel forwardly of both the driver and passenger sides of the occupant and having releasable fasteners fastening the instrument cover to the instrument panel structure so that the inflating air bag may lift and flex the instrument panel cover to permit the inflating air bag to project into the occupant compartment in front of the passenger.

A further feature, object and advantage of the invention resides in the provision of an instrument panel cover connected to the instrument panel structure by detachable fasteners and having stiffening ribs and features on the underside thereof which provide a durable and strong instrument panel cover for concealing and protecting the air bag module and yet permit flexure and assist in channeling the inflating air bag rearwardly into the passenger compartment upon air bag inflation lifting the instrument panel cover and detaching the detachable fasteners.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
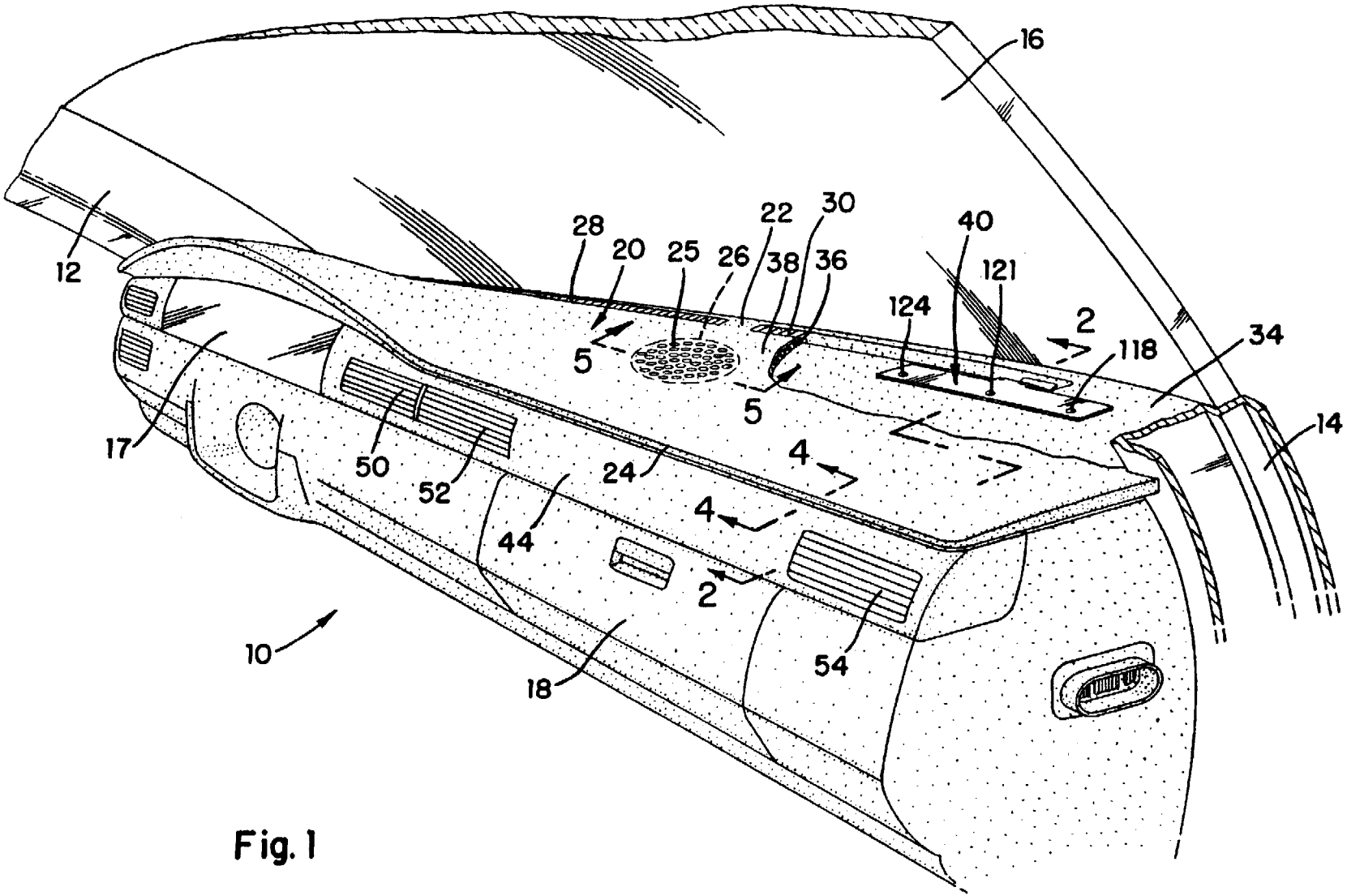
FIG. 1 is a perspective view of a motor vehicle instrument panel showing the instrument panel cover in its normal position and having parts broken away and in section.

Referring to FIG. 1, a motor vehicle body has an instrument panel structure 10 extending transversely across the vehicle body between the pillars 12 and 14 supporting a windshield 16. The left hand end of the instrument panel includes an instrument cluster 17 located in front of the vehicle driver. The right hand end of the instrument panel structure 10 is positioned forwardly of the passenger seating position and includes a glove box 18.

The instrument panel structure 10 includes an instrument panel cover assembly 20 which is generally horizontal and extends transversely across the car between the pillars 12 and 14 and also extends longitudinally between a forwardmost edge 22 thereof adjacent the windshield 16 and a rearwardmost edge 24 closest to the occupant compartment. The instrument panel cover 20 has a plurality of openings 25 therein which overlie a radio speaker 26. In addition, the instrument panel cover 20 has defroster openings 28 and 30 generally adjacent the forwardmost edge 22 for conveying defroster air onto the windshield 16. FIG. 1 shows the instrument panel cover 20 cut away to reveal that the instrument panel cover 20 includes a molded plastic lower retainer panel 34, a layer of foam padding 36, a vinyl sheet cover 38, and a reinforcing hinge bracket 40 to be discussed further hereinafter. In addition, the instrument panel structure 10 includes a trim panel 44 which extends transversely from the instrument cluster 17 and houses air conditioning outlet grills 50, 52, and 54.

Figure 2:
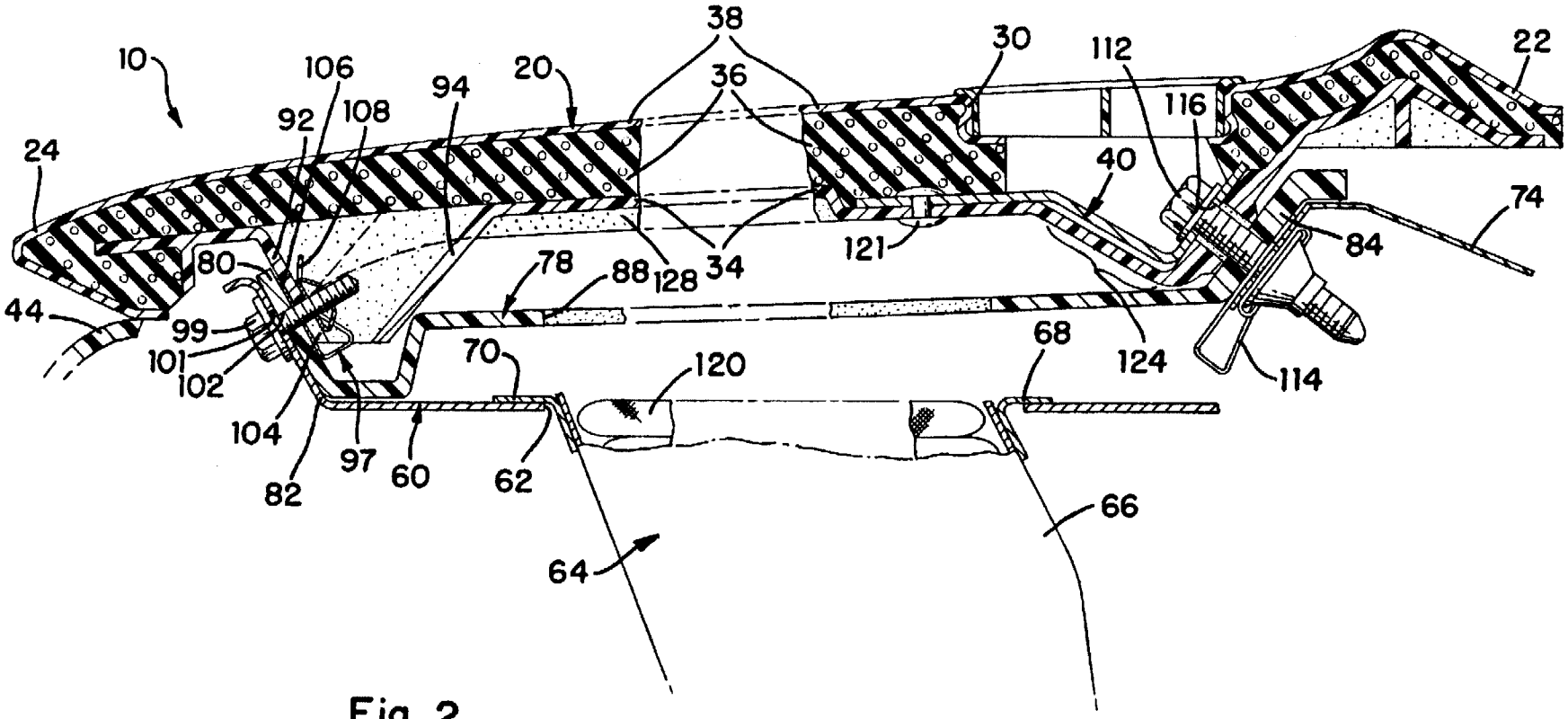
FIG. 2 is a section view taken in the direction of arrows 2—2 of FIG. 1 and showing the construction of the instrument panel structure and the instrument panel cover which conceals the air bag module.
Figure 3:
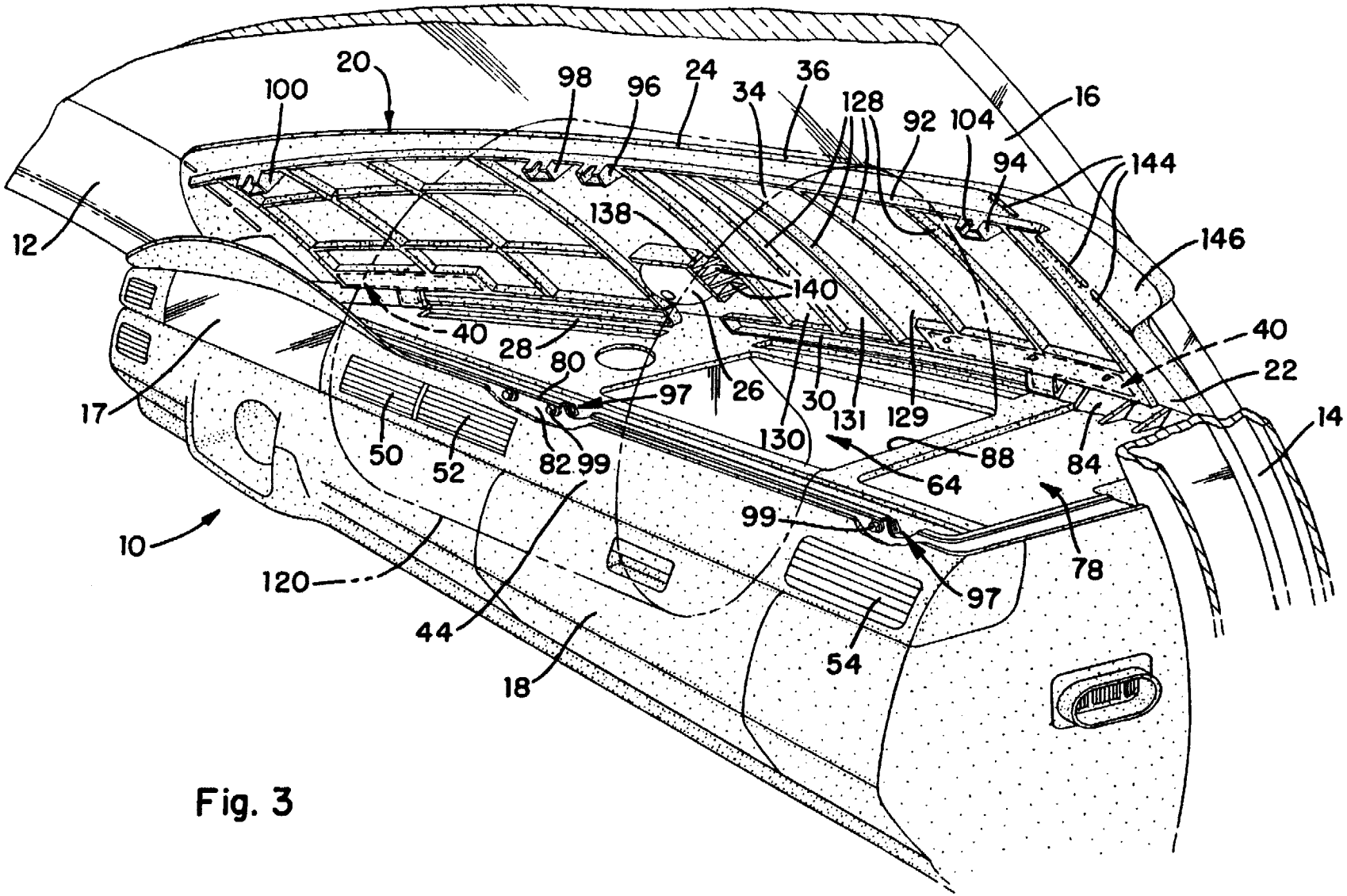
FIG. 3 is a view similar to FIG. 1 showing that detachable fasteners have been employed along the entire width of the instrument panel cover so that the entire rearward edge of the instrument cover is lifted by the deploying air bag.

Referring to FIG. 2, it is seen that the instrument panel structure 10 includes a sheet metal reinforcement 60 which underlies the instrument panel cover 20 and has an opening 62 in which an air bag module, indicated generally at 64, is mounted. The air bag module 64 includes a housing 66 having mounting flanges 68 and 70 which are suitably attached to the reinforcement 60. The instrument panel structure 10 also includes a cowl reinforcement 74 which extends transversely generally adjacent the windshield. A molded plastic support panel 78 extends transversely across the vehicle and has a rearward leg 80 engaging a leg 82 of the reinforcement 60, and a forwardmost leg 84 which engages the cowl reinforcement 74. The support panel 78 has an air bag opening 88 which registers with the air bag module As seen in FIGS. 2 and 3, the plastic lower retainer panel 34 of the instrument panel cover 20 has a continuous lip 92 extending along the rearwardmost underside thereof and attachment legs 94, 96, 98, and 100 spaced along the width of the cover 20. As best seen in FIG. 2, the attachment leg 94 receives a spring clip fastener 97 having outer leg 106 and inner leg 108. A bolt 99 extends through a hole 101 of the reinforcement 60, a hole 102 of the support panel 78, and a downward opening slot 104 of the attachment leg 94. The bolt 99 is threadedly engaged in the inner leg 108 of the clip 97 so that the attachment leg 94 is frictionally gripped between the legs 106 and 108 of the spring clip 97. Furthermore, as seen in FIG. 3, it will be appreciated that each of the attachment legs 96, 98 and 100 are constructed similar to the attachment leg 94 and are respectively attached to the instrument panel structure by bolt and clip arrangements similar to the bolt 99 and clip 97 shown in FIG. 2. The attaching bolts are installed by reaching through the openings provided for outlets 50, 52, and 54.

As best seen by reference to FIGS. 1 and 2, the forwardmost portion of the instrument panel cover 20 is attached to the instrument panel structure by a plurality of fixed attachments, one of which is shown in FIG. 2 and includes a bolt 112 which extends through aligned holes in the retainer 34, the support panel 78, and the cowl reinforcement 74. The bolt 112 threadedly engages a spring nut 114 so that the forwardmost portion of the instrument panel cover 20 is fixedly attached to the instrument panel structure.

The bolt 112 also extends through a bolt hole 116 in the hinge bracket 40. As seen in FIGS. 1 and 2, the hinge bracket 40 extends transversely approximately the width of the air bag module and is attached to the retainer panel 34 by a plurality of rivets 118, 121, and 124. As seen in FIG. 2, the bolt 112 is conveniently installed during vehicle assembly through the defroster opening 30 of the instrument panel cover 20. It will be appreciated that the forward edge portion of the cover 20 is retained to the instrument panel structure 10 by a plurality of bolts similar to the bolt 112 of FIG. 2.

FIG. 3 shows the instrument panel cover 20 having been lifted upwardly by the inflation of the phantom line indicated air bag 120. This lifting of the instrument panel 20 is permitted by the detachable fasteners provided at the legs 94, 96, 98, 100 being overcome by the force applied to the underside of the lower retainer panel 34 by the inflating air bag. More particularly, as seen in FIG. 2, the initial inflation of the air bag will cause the air bag to rise upwardly through the opening 88 in the support panel 78 and engage against the underside of the retainer panel 34. The magnitude of the force applied by the air bag will overcome the frictional force applied against the attachment leg 94 by the legs 106 and 108 of the fastening clip 97. The slot 104 opens downwardly about the bolt 99 permitting the leg 94 to be released from the bolt 99 as the retainer panel 34 lifts upwardly. During this upward lifting and pivoting movement of the retainer panel 34, the retainer panel will flex and bend at an integral hinge region axis defined therein generally at 124 in FIG. 2. During such flexure, the hinge bracket 40 reinforces the hinge region axis 124 to reduce any tendency of the plastic to fracture under flexure.

Figure 4:
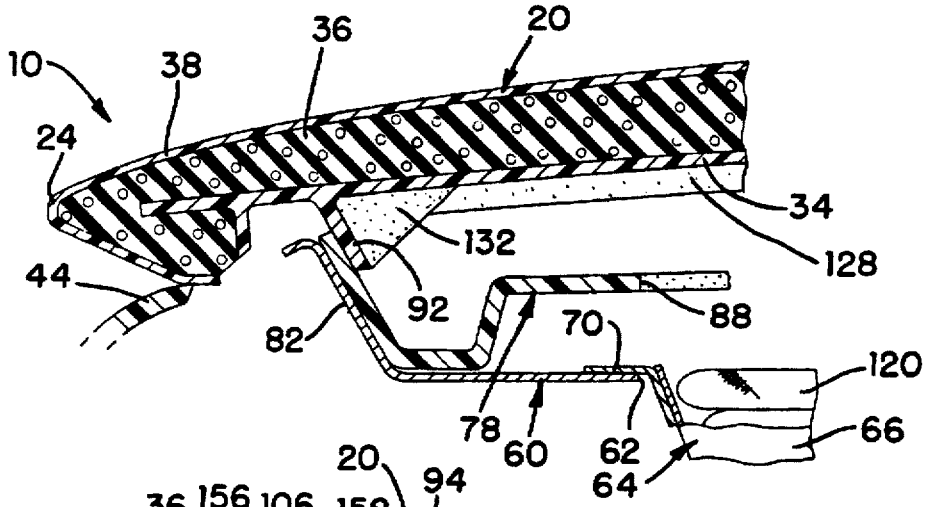
FIG. 4 is a section view taken in the direction of arrows 4—4 of FIG. 1 showing a fragmentary view of the rearwardmost edge of the instrument panel cover.

Referring again to FIG. 3, it is seen that the underside of the retainer 34 includes a plurality of integrally molding stiffening ribs 128 which project downwardly from the panel 34 and span across the air bag opening 88 of the support panel 78. The stiffening ribs 128 stiffen the instrument panel cover 20 against downward flexure. Furthermore, the stiffening ribs 128 extend only in the longitudinal direction and do not present resistance to the unfolding of the air bag and will contribute to such unfolding by defining longitudinal channels 129, 130, and 131 which assist in projecting the inflating air bag rearwardly toward the occupant. As seen in FIG. 4, a plurality of additional ramped reinforcing ribs, one of which is shown 132, are provided between the underside of the retainer panel 34 and the rear lip 92. A plurality of these stiffening ribs 132 are provided intermediate the stiffening ribs 128 and prevent the air bag from being retarded in its unfolding action by engagement with the lip 92.

Figure 5:
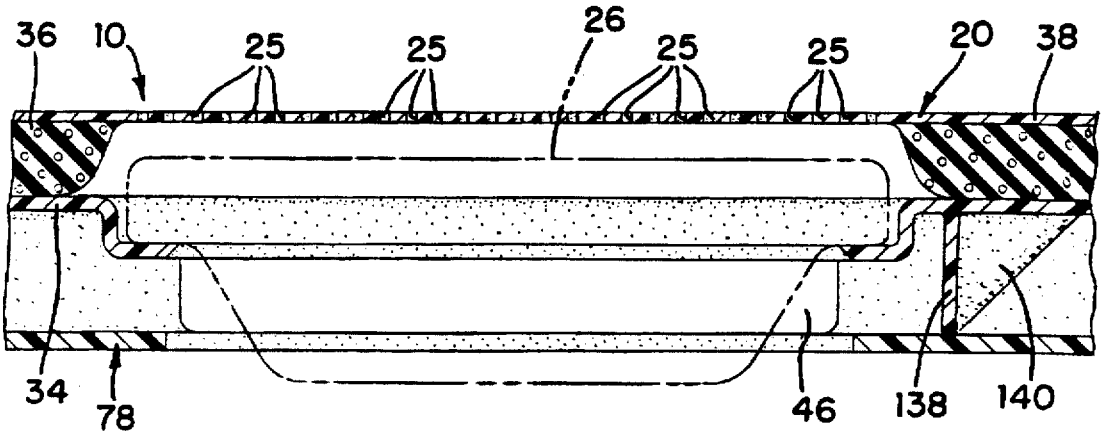
FIG. 5 is a section view taken in the direction of arrows 5—5 of FIG. 1 showing the mounting of a radio speaker on the instrument panel.

FIG. 5 shows a section through the instrument panel cover 20 in the region of the speaker 26 and shows an integrally molded downward extending lip 138 which prevents the inflating air bag from striking the speaker 26. The plurality of reinforcing ribs 140 extend between the lip 138 and the underside of the retainer panel 34 to stiffen the lip 138 against flexure without resisting the inflation of the air bag.

Referring again to FIG. 3, it is seen that a line of relief slots 144 are provided in the retainer panel 34 at the rightwardmost portion 146 of the instrument panel cover 20 which reaches around the windshield pillar 14. These slots 144 in the panel will weaken the lower retainer panel 34 so that the instrument panel cover 20 can flex around the pillar 14 as the cover 20 is pivoted upwardly from the FIG. 1 position to the FIG. 3 position.

In the preferred embodiment of the invention, the retainer 34 is molded of a thermoplastic material such as Dylark, a trademark of Arco Chemical Company. The thermoplastic material is filled with about 10% glass fiber reinforcement. This plastic material, or equivalent, is chosen for its strength and rigidity for providing a durable instrument panel cover, while at the same time having sufficient flexibility to permit flexure from the normal position of FIG. 1 to the upwardly lifted position of FIG. 3. The instrument panel cover is preferably manufactured by foaming the layer of foam 36 in place between the retainer panel 34 and the vinyl sheet cover 38 so that the foam 36 is tenuously adhered to the retainer panel 34 and the sheet cover 38.

The retainer 34 may be made of sheet metal or of any suitable plastic material and the reinforcing hinge bracket 40 may be eliminated.

Figure 6:
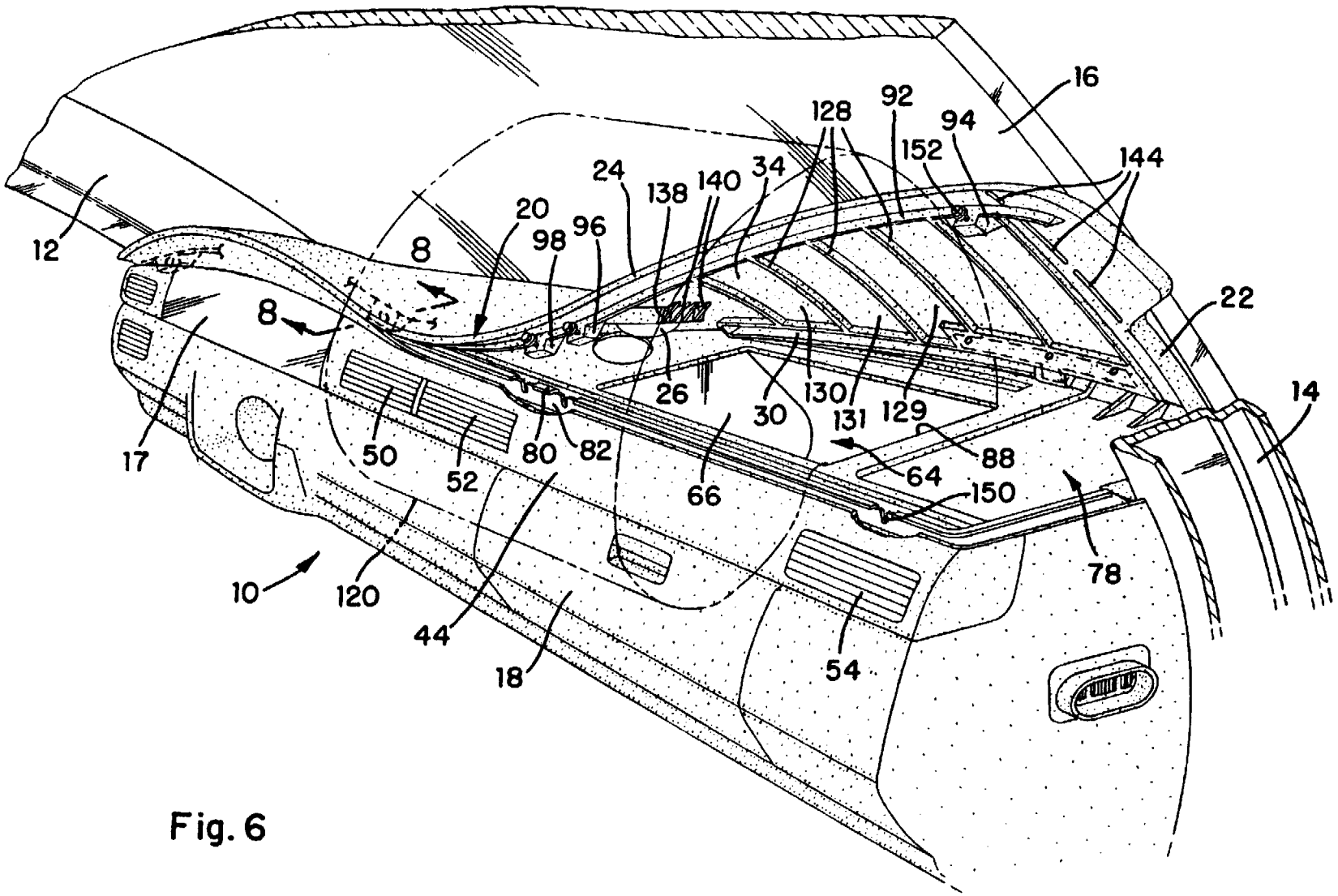
FIG. 6 is a view similar to FIG. 3 but shows an alternative construction with upward lifting and flexure of the instrument panel cover upon release of detachable fasteners provided only at the portion of the cover forwardly of the passenger.

Referring to FIG. 6, an alternative embodiment of the invention is shown in which the portion of the instrument panel cover forwardly of the driver is fixedly attached to the instrument panel structure. A typical one of the fixed attachments shown in FIG. 8 also includes an attachment leg 156 which receives a spring clip fastener 158. A bolt 160 extends through the leg 82 of the reinforcement 60, through the rearward leg 80 of support panel 78, and through the attachment leg 156 to fixedly attach the instrument panel cover 20 to the instrument panel structure 10. Accordingly, as viewed in FIG. 6, only the righthand portion of the instrument panel cover is lifted as permitted by the release of the attachment legs 94, 96 and 98. It will be appreciated that the instrument panel cover 20 of FIG. 6 will experience greater flexure than the instrument panel cover of FIG. 3.

Figure 7:
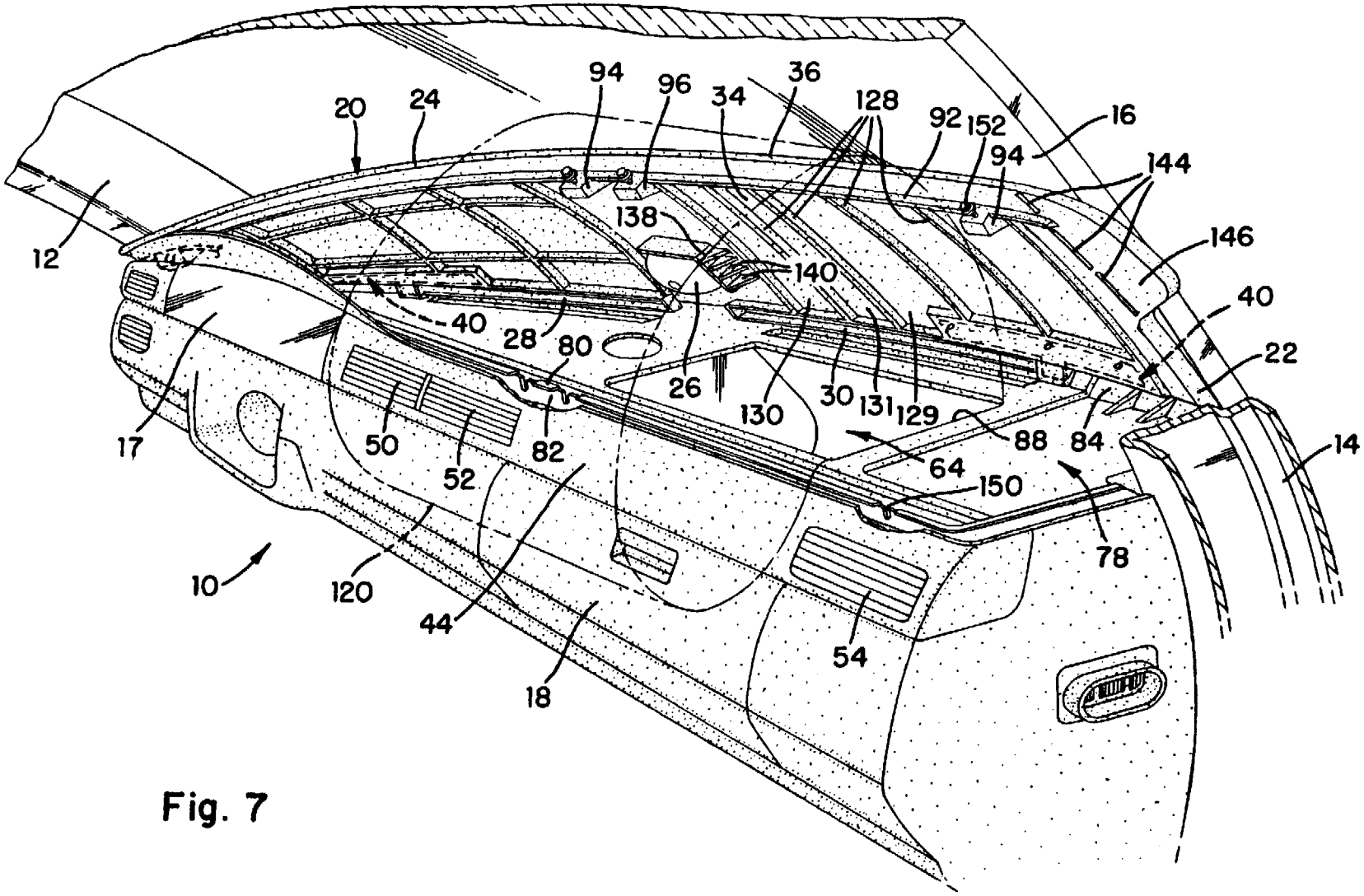
FIG. 7 is a view similar to FIG. 6 but showing an alternative construction in which additional detachable fasteners are employed mounting the instrument panel cover on the instrument panel structure so that a greater portion of the instrument panel cover is lifted by the deploying air bag.

FIG. 7 shows yet another embodiment of the invention which employs the detachable attachments of attachment legs 94, 96, and 98. However, the corner of the instrument panel 20 adjacent the driver is fixedly attached to the instrument panel structure by the fixed attachments of FIG. 8 so that the central and righthandmost parts of the instrument panel cover are lifted upwardly while the corner adjacent the driver remains in place.

Referring again to FIGS. 6 and 7, it will be seen that the attachment leg 94 is modified from that of FIGS. 3 by having the support panel 78 slotted at 150 and by having a bolt 152 threaded into so that the bolt 152 will be withdrawn from the slot 150 and remain attached to the attaching leg 94. This is in contrast to the arrangement of FIG. 3 where the attachment legs of the instrument panel cover were slotted so that the attaching bolt would remain on the instrument panel structure instead of rising with the cover 20.

It will be appreciated that upon deflation of the air bag, the flexure characteristics of the instrument panel cover 20 will cause the instrument panel to return substantially to the normal position of FIG. 1.

Figure 8:
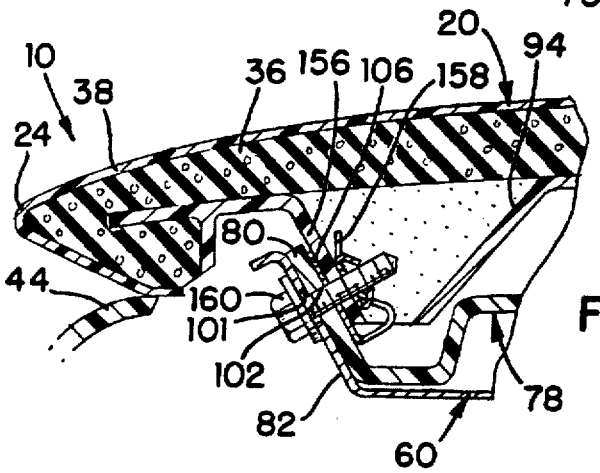
FIG. 8 is a section view taken in the direction of arrows 8—8 of FIG. 6.

It will also be appreciated that the particular fixed attachment construction of FIG. 8 and detachable attachment construction of FIG. 2 are provided as preferred examples and that any equivalent structures well known in the prior art may be employed. The fixed attachments may be provided by any conventional fastener of the type which will remain connected under the force of the inflating air bag, while the detachable attachments may be provided by any fastener of the type which will release under the load of the inflating air bag.

Thus it is seen that the invention provides a new and improved instrument panel cover covering an air bag module and detachably retained to be lifted away from the instrument panel and permit the air bag to inflate into the occupant compartment.

The embodiments of the invention in which an exclusive property or privilege is claimed are defined as follows:

1. In combination with a motor vehicle having an instrument panel structure extending transversely across the vehicle body forwardly of *both* the driver and passenger sides of the occupant compartment and between windshield pillars supporting a windshield[;] *:*

[an] *a passenger side* air bag module mounted on the instrument panel structure forwardly of the passenger *side only* and having an air bag normally stored and folded therein and inflatable to project into the *passenger side only of the* occupant compartment to restrain *only* the passenger, a unitary one-piece instrument panel cover mounted atop the instrument panel structure to conceal the air bag from view and extending transversely the entire distance across the instrument panel structure forwardly of both the driver and passenger sides of the occupant compartment, and further extending longitudinally between a forwardmost edge thereof [adjacent] *nearest* the windshield and a rearwardmost edge thereof nearest the occupant so that the instrument panel cover conceals *both the passenger side and driver side of* the [entire] instrument panel structure and *the* air bag module, and fasteners fastening the instrument panel cover to the instrument panel structure, said fasteners including first fasteners fastening at least the portion of the instrument panel cover generally forward of the passenger in a detachable manner permitting the inflating air bag to lift the instrument panel cover upwardly away from the instrument panel structure upon air bag inflation to permit the air bag to project into the *passenger side of the* passenger compartment.

2. The combination of claim 1 further characterized by said instrument panel cover being of flexible construction and said fasteners further including second fasteners fastening the portion of the instrument panel cover generally forward of the driver in a non-detachable manner so that the portion forwardly of the driver remains mounted atop the instrument panel structure and the portion of the instrument panel cover forwardly of the passenger flexes upwardly during the air bag inflation.

3. In combination with a motor vehicle having an instrument panel structure extending transversely across the vehicle body forwardly of *both* the driver and passenger sides of the occupant compartment and between windshield pillars supporting a windshield:

[an] *a passenger side* air bag module mounted on the instrument panel structure forwardly of the passenger *side only* and having an air bag normally stored and folded therein and inflatable to project into the *passenger side only of the* occupant compartment to restrain *only* the passenger, an instrument panel cover of generally planar flexible construction mounted atop the instrument panel structure to conceal the air bag from view and extending transversely the entire distance across the instrument panel structure forwardly of both the driver and passenger sides of the occupant compartment and further extending longitudinally between a forwardmost edge thereof [adjacent] *nearest* the windshield and a rearwardmost edge thereof nearest the occupant so that the instrument panel cover conceals *both the passenger side and driver side of* the [entire] instrument panel structure and *the* air bag module, a plurality of first fasteners fastening the forwardmost edge of the instrument panel cover to the instrument panel structure and adapted to retain the forwardmost edge during inflation of the air bag, and a plurality of second fasteners fastening at least the rearwardmost edge of the instrument panel cover forwardly of the passenger and adapted to release the rearwardmost edge of the instrument panel cover from the instrument panel structure upon the application of a lifting force against the underside of the instrument panel cover by the inflating air bag so that the inflating air bag lifts the instrument panel cover upwardly as permitted by flexing of the instrument panel cover to permit the air bag to project into the passenger compartment for restraint of the passenger.

4. The combination of claim 3 further characterized by said instrument panel cover including a molded plastic retainer panel having stiffening ribs formed integrally on the underside thereof in transversely spaced apart longitudinally extending relation to stiffen the instrument panel cover for bridging across the air bag module.

5. The combination of claim 3 further characterized by the instrument panel cover including a molded plastic retainer panel having a stiffening lip depending therefrom along the rearwardmost edge and having integrally molded reinforcing ramps stiffening the lip against flexure and preventing the presence of the lip from retarding the projection of the air bag into the passenger compartment.

6. The combination of claim 3 further characterized by the instrument panel cover including a molded plastic retainer panel and a reinforcing bracket attached to the retainer panel and fastened to the instrument panel structure to reinforce the retainer panel against fracture upon the upward lifting and flexure of the instrument panel cover by the inflating air bag.

7. The combination of claim 3 further characterized by the instrument panel cover having a molded plastic retainer panel and reaching around the windshield pillars, and a plurality of weakening slots molded into at least one end of the molded plastic retainer panel to permit the retainer panel to flex around the adjacent pillar upon engagement of the instrument panel cover with the adjacent pillar upon the upward lifting and flexure of the instrument panel cover.

8. In combination with a motor vehicle having an instrument panel structure extending transversely across the vehicle body forwardly of the driver and passenger sides of the occupant compartment and between windshield pillars supporting a windshield:

an air bag module mounted on the instrument panel structure forwardly of the passenger and having an air bag normally stored and folded therein and inflatable to project into the passenger compartment, an instrument panel cover mounted atop the instrument panel structure and including a molded plastic retainer panel extending transversely the entire distance across the instrument panel structure forwardly of both the driver and passenger sides of the occupant compartment and so that the instrument panel cover conceals the entire instrument panel structure and air bag module, having a forwardmost edge fixedly attached to the instrument panel structure and a rearwardmost edge releasably attached to the instrument panel structure, said molded plastic retainer panel being sufficiently rigid to bridge across the air bag module and being lifted and flexed upwardly by the inflating air bag so that the rearwardmost edge is released from the instrument panel structure to permit air bag expansion into the passenger compartment while the forwardmost edge remains fixedly attached, and a layer of foam molded atop the plastic retainer panel and adhering to the plastic retainer panel so that the foam retains the plastic retainer panel in the event of the fracture of the molded plastic retainer panel when lifted by the inflating air bag.

9. In combination with a motor vehicle having an instrument panel structure extending transversely across the vehicle body forwardly of *both* the driver and passenger sides of the occupant compartment and between windshield pillars supporting a windshield:

[an] *a passenger side* air bag module mounted on the instrument panel structure and having an air bag normally stored and folded therein and inflatable to project into the *passenger side only of the* passenger compartment to restrain an occupant, an instrument panel cover of generally planar flexible construction mounted atop the instrument panel structure to conceal the air bag from view and extending transversely the entire distance across the instrument panel structure forwardly of both the driver and passenger sides of the occupant compartment and further extending longitudinally between a forwardmost edge thereof [adjacent] *nearest* the windshield and a rearwardmost edge thereof so that the instrument panel cover conceals *both the passenger side and driver side of* the [entire] instrument *panel* structure and *the* air bag module, a plurality of first fasteners fastening the forwardmost edge of the instrument panel cover to the instrument panel structure and adapted to retain the forwardmost edge during inflation of the air bag, and a plurality of second fasteners fastening at least the rearwardmost edge of the instrument panel cover forwardly of the passenger and adapted to release the instrument panel cover from the instrument panel structure upon the application of a lifting force against the underside of the instrument panel cover.

*10. In combination with a motor vehicle having an instrument panel structure extending transversely across the vehicle body forwardly of both the driver and passenger sides of the occupant compartment and between windshield pillars supporting a windshield:*

*a passenger side air bag module mounted on the instrument panel structure forwardly of the passenger and having an air bag normally stored and folded therein and inflatable to project into the occupant compartment to restrain the passenger only,*

*and a flexible instrument panel cover extending atop the instrument panel structure forwardly of both the driver*

*and the passenger and atop the side air bag module, said instrument panel cover being fixedly fastened to the instrument panel structure forward of the driver and being detachably fastened to the instrument panel structure forward of the passenger so that upon inflation of the air bag the instrument panel cover is flexed and the portion of the instrument panel cover forward of the passenger is lifted to permit the air bag to project into the passenger side of the occupant compartment for restraint of the passenger, while the portion of the instrument panel cover forwardly of the driver remains fixedly fastened to the instrument panel structure.*

* * * * *